United States Patent
Faihe et al.

(10) Patent No.: US 7,284,155 B2
(45) Date of Patent: Oct. 16, 2007

(54) REMOTE SOFTWARE SUPPORT AGENT SYSTEM WITH ELECTRONIC DOCUMENTS FOR TROUBLESHOOTING

(75) Inventors: Yassine Faihe, Echirolles (FR); Philip Andrew Flocken, Denver, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 494 days.

(21) Appl. No.: 10/810,663

(22) Filed: Mar. 29, 2004

(65) Prior Publication Data

US 2005/0223285 A1   Oct. 6, 2005

(51) Int. Cl.
*G06F 11/00* (2006.01)

(52) U.S. Cl. .............................. 714/37; 714/29; 714/39; 717/124; 717/130; 717/131

(58) Field of Classification Search .................. 714/26, 714/37, 39; 717/124, 130, 131
See application file for complete search history.

(56) References Cited

U.S. PATENT DOCUMENTS

| 2004/0078667 | A1* | 4/2004 | Salem ......................... 714/26 |
| 2004/0128585 | A1* | 7/2004 | Hind et al. ................... 714/38 |
| 2004/0143778 | A1* | 7/2004 | Vollmar et al. ............... 714/37 |
| 2004/0153791 | A1* | 8/2004 | Arend ......................... 714/26 |
| 2004/0163076 | A1* | 8/2004 | Zayas et al. ................ 717/124 |
| 2004/0220894 | A1* | 11/2004 | Soluk et al. ................. 706/50 |
| 2005/0172272 | A1* | 8/2005 | Bates et al. ................ 717/129 |
| 2006/0101417 | A1* | 5/2006 | Hoh ........................... 717/130 |

* cited by examiner

*Primary Examiner*—Scott Baderman
*Assistant Examiner*—Tim Bonura

(57) ABSTRACT

A method of and system for troubleshooting a first computer system using a second computer system having a processor and a memory storing an electronic document including troubleshooting information and storing a set of troubleshooting commands for execution by the first computer system is described. The troubleshooting command set is related to the troubleshooting information contained in the electronic document. A method of generating an electronic document including troubleshooting information and a set of troubleshooting commands for execution by a first computer system is also described.

23 Claims, 2 Drawing Sheets

REMOTE SOFTWARE SUPPORT AGENT SYSTEM WITH ELECTRONIC DOCUMENTS FOR TROUBLESHOOTING

FIELD OF THE INVENTION

The present invention relates to a system for troubleshooting a computer system and corresponding method of providing the troubleshooting system to a user.

BACKGROUND

It is known in the art to provide access to troubleshooting information regarding computer software via information published on a computer network, an example of such a network being the world-wide packet-switched network commonly referred to as the Internet. Various software-producing companies provide web pages on web sites, i.e., hypertext markup language (HTML) based files, for access by users attempting to identify and correct a problem with software produced by the company or additional software, e.g., third party software, interacting with company-produced software.

Currently, software-producing companies use various manual and semi-automated mechanisms for delivering software support assistance to their users. Company software support engineers assist users via telephone, through on-site engagements, or through the use of remote collaboration software enabling a support engineer to take control of the user's computing environment temporarily or guide the user through a set of actions needing to be taken in the user's computing environment for troubleshooting purposes. In all cases, the support engineer typically needs to examine information in the user's environment to troubleshoot a problem and make changes in the user's environment to fix an identified problem. This requires time to be spent by the support engineer and by the user, and this time is costly for both parties.

Attempting to reduce the time required to troubleshoot and repair software problems, many companies host support web sites available to users, as described above. These web sites contain documents about troubleshooting and fixing various problems known to occur with the company's software. Typically, a company support engineer uses an authoring system tool to create troubleshooting documents after encountering a new issue reported by a user. These documents are often referred to as forming a portion of a knowledge base concerning the software produced by the company and specific documents identifying errors, problems, and associated fixes and information documentation are referred to as knowledge base documents. The nature of the fixes includes patches, hot fixes, and commands.

However, if a user encountering a software problem cannot find a useful troubleshooting document on the support website (or does not wish to spend time looking for such a document), the user is likely to call a support engineer for assistance. In this case, the support engineer will often choose to search the knowledge base of troubleshooting documents to see if there are any hints for solving the user issue. After the support engineer determines what needs to be performed, the support engineer initiates a manual or semi-automated process, as described above. In a more advanced case, the support engineer creates an executable software application, referred to as an agent, configures the agent with the appropriate knowledge for the troubleshooting task, and transmits the agent to the user. This type of user interaction enhances the user experience and contributes to building a pool of reusable solutions.

Unfortunately, the knowledge on how to fix such issues reported in the past and captured in troubleshooting documents is not utilized efficiently. An embodiment according to the present invention, as disclosed below, proposes how the knowledge can be automatically leveraged, and how the same knowledge can be used to provide direct remote support assistance for the user.

To the inventors' knowledge, there are no automated solutions for leveraging troubleshooting document knowledge as described in the present invention disclosure. Currently used manual and semi-automated solutions have been described above.

SUMMARY

The present invention provides a system for troubleshooting a computer system using an electronic document including troubleshooting information and access to one or more troubleshooting commands for execution by the computer system. The troubleshooting commands are related to the troubleshooting information contained in the electronic document.

A method aspect includes receiving a troubleshooting request at a first computer system from a second computer system. Responsive to the troubleshooting request, the first computer system transmits an electronic document to the second computer system. The electronic document includes access to one or more troubleshooting commands associated with the electronic document.

A system aspect includes a first computer system including a memory storing an electronic document including troubleshooting information and one or more troubleshooting commands for execution by a second computer system and related to the troubleshooting information of the electronic document. The one or more troubleshooting commands are associated with the electronic document. The first computer system further includes a processor for receiving a troubleshooting request from the second computer system and, responsive to the troubleshooting request, transmits the electronic document and access to the one or more troubleshooting commands to the second computer system.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

In contrast with the above-described approaches, a mechanism according to an embodiment of the present invention provides a system for troubleshooting a computer system using an electronic document including troubleshooting information and access to one or more troubleshooting commands for execution by the computer system. The troubleshooting commands are related to the troubleshooting information contained in the electronic document.

An embodiment of the present invention consists of a mechanism capable of automatically retrieving one or more instructions of software-based troubleshooting actions and/or repair actions from a knowledge base document or from a related file on a server computer, and performing those actions on a client computer. In a further embodiment, an error at a first computer is automatically detected at the first computer and a description of the error is provided to a second computer. The second computer includes a knowledge base having knowledge base documents including access to one or more troubleshooting instructions responsive to the detected error. The second computer transmits the one or more instructions to the first computer for automatic execution by the first computer to correct the error.

As described below, the troubleshooting knowledge base includes a knowledge base document for helping users solve by themselves (self-solve) problems they may have with software executing on their computer. Typically, the knowledge base document describes the problem, the problem context, and provides information about what steps should be performed to resolve the problem, e.g., the provided information relates to a change of the computer configuration, one or more commands to be executed on the client computer, etc.

Figure 1:
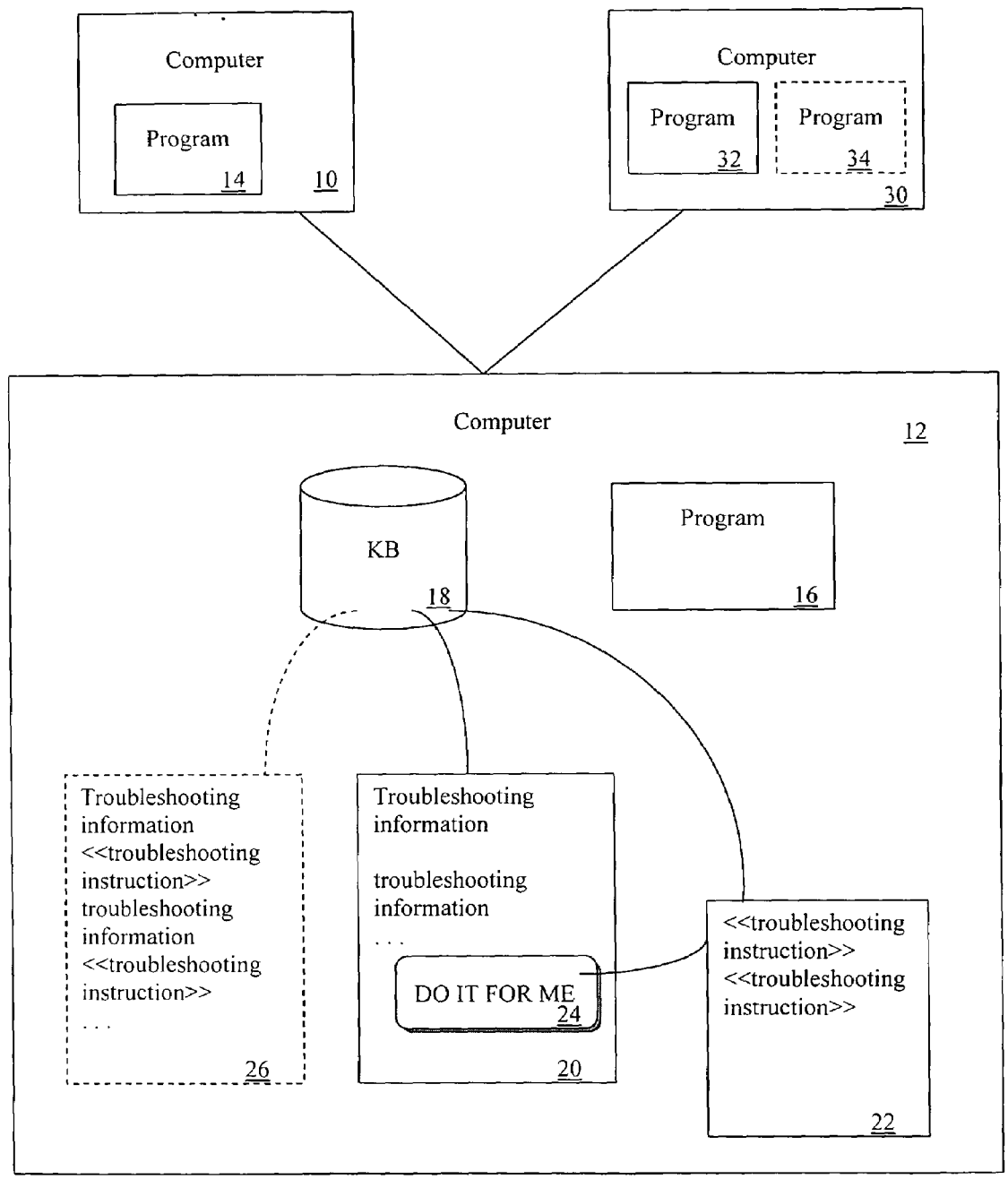
FIG. 1 is a high level block diagram of an embodiment according to the present invention.

An exemplary embodiment of the present invention is now described with reference to FIG. 1 depicting a user computer 10 useable by a user and able to communicate with a server computer 12, e.g., a software company's troubleshooting information web server. User computer 10 is described below in more detail with reference to FIG. 2 and includes a client program 14, i.e., an executable set of instructions. Server computer 12, similar to user computer 10 and able to communicate with user computer 10, includes a server program 16 and a knowledge base data store 18.

Client computer 10 executes client program 14 and communicates with server program 16 executed by server computer 12 in the software company's infrastructure. Communication between client program 14 and server program 16 uses standard network protocols known to persons of skill in the art. In one embodiment, the network protocols used include hypertext transport protocol (HTTP) or secure HTTP (HTTPS). Although HTTP and HTTPS are described, persons of skill in the art will understand that alternate protocols may be used to practice an embodiment according to the present invention.

After a software problem occurs on client computer 10, e.g., an error message is displayed to the user, the user manually invokes client program 14, i.e., the user causes execution of client program 14 by the client computer, and provides input to the client program including a description of an issue with the client computer, e.g., a description of the problem, error message, or other information relevant to troubleshooting. In one embodiment, client program 14 may be a web browser for receiving input from the user to be transmitted to a web server of the company, e.g., server program 16 executed by server computer 12. In another embodiment, client program 14 may be a software agent executing on client computer 10 and configured to be able to communicate with server computer 12.

In an alternate embodiment, client program 14 monitors execution of other software executables (not shown) which may be present on user computer 10. Client program 14 monitors the other software executables in order to automatically detect software failures by executing additional computer software executables, either executing as part of client program 14 or as separately executing programs (not shown) on user computer 10 as is known to persons skilled in the art to monitor the status of the other software executables.

After server program 16 receives an issue description from client program 14, server program 16 analyzes the described issue and identifies a knowledge base document 20 in the software company's knowledge base 18 appropriate for resolution of the issue. In one embodiment, a database or other mechanism is used to store the company's knowledge base data store 18, and one or more of a number of search engine and database search technologies are used to organize, maintain, and search for the issue described. In one particular embodiment, a web-server, or web serving software executed on server computer 12, is used to provide an interface to client computer 10 to facilitate interaction with the user.

Within the knowledge base 18, a unique set of one or more troubleshooting commands 22, specific to one or more issues, is associated with each knowledge base document 20. For example, in one embodiment, an activatable hyperlink button 24 embedded in document 20 enables access by users to an instruction file, i.e., a troubleshooting command set 22 on server 12. The troubleshooting command set 22 contains a sequence of one or more instructions for the command(s) to be executed by client computer 10 to resolve the described issue. It is to be understood by persons of skill in the art that the troubleshooting command set 22 may include a single instruction or a plurality of instructions for a command(s) to be executed by client computer 10.

After receipt and processing of the issue description, server computer 12 returns the most appropriate solution document, e.g., knowledge base document 20, to the user in an email or via a web page, whereupon the user decides which documents are appropriate before enabling automatic execution of the associated troubleshooting or repair command(s), e.g., troubleshooting command set 22. Server program 16 executed by server computer 12 causes transmission of the user selected appropriate instruction set to client program 14 executed by client computer 10, and the client computer executes the client program causing execution of the downloaded instruction set. In this manner, client program 14 acts as a remote support agent, capable of executing the command(s) necessary to troubleshoot and/or repair a software issue at client computer 10.

The remote support agent is a software executable capable of receiving an instruction, or reading the instruction from a stack-based memory structure, checking pre-conditions associated with the instruction, requesting user confirmation of the instruction execution on client computer 10, if required, executing the instruction on the client computer and checking post-conditions associated with the executed instruction. A next instruction may be received and the process repeats for all instructions to be executed by the remote support agent. If execution confirmation by a user is not required, the agent proceeds to receive instructions, check pre-conditions, execute the instruction on client computer 10, and check post-conditions without user intervention. In one embodiment, the agent requests a password, e.g., a root password, to execute instructions.

In the above-described manner, the remote support agent is a generic executable shell independent from the knowledge base document 20 and associated troubleshooting command set 22. In one embodiment, the agent includes an interactive user interface akin to a wizard for guiding the user. The associated troubleshooting command set 22 includes a series of one or more commands, pre-conditions, and post-conditions. If the command set 22 is integrated with knowledge base document 20, appropriate identifying tags, e.g., XML/HTML tags, identify the command(s) within the knowledge base document. In this manner, creation of a remedy support agent configured to resolve an issue on client computer 10 consists of instantiating an agent and loading one or more commands from a knowledge base document 20.

Listings 1a, 1b depict an exemplary listing of a portion of a document according to the above embodiment wherein the knowledge base document 20 includes troubleshooting information and troubleshooting command set 22 includes troubleshooting instructions. Listing 1a depicts a portion of knowledge base document 20 and listing 1b depicts a portion of associated troubleshooting command set 22 for transmission to and execution by client computer 30.

---
Listing 1a
---
Procedure:
=========
a) stop the current instance (if NNM processes are still running)
ovdbcheck -stop
b) remove the current DB files
HP-UX/Solaris
cd $OV_DB/analysis/default
rm solid.db
rm solmsg.*
rm ./log/sol*.log Listing 1b

```
<CMD>
    <PRECONDITION>
        <DESC>Check if NNM processes are still
running</DESC>
        <EXEC>ps -ef | grep . . . </EXEC>
    </PRECONDITION>
    <EXEC>ovdbcheck -stop</EXEC>
    <POSTCONDITION>
    . . .
    </POSTCONDITION>
</CMD>
<CMD>
    <DESC>Remove the current DB files</DESC>
    <EXEC>cd $OV_DB/analysis/default</EXEC>
    <EXEC>rm solid.db</EXEC>
    <EXEC>rm solmsg.*</EXEC>
    <EXEC>rm ./log/sol*.log</EXEC>
</CMD>
```
---

In an alternate embodiment, client computer 10 receives and automatically executes the troubleshooting command set 22 from server computer 12. In yet another embodiment, troubleshooting command set 22 is integrated into knowledge base document 20 as depicted in integrated knowledge base document 26 (dotted line). Integrated knowledge base document 26 includes both troubleshooting information, as found in knowledge base document 20, and troubleshooting instructions, as found in troubleshooting command set 22.

Listing 2 depicts an exemplary listing of a portion of an XML-based document according to the above alternate embodiment wherein both troubleshooting information and troubleshooting instructions are integrated in a single knowledge base document 26.

---
Listing 2
---
```
<QUESTION>
How can I change the configuration of my VVV Server on my unix
system to read from my backup database when my primary database is
down?
</QUESTION>
<ANSWER>
You must execute the vvvconfig.sh script with the -s, -b, and -d options.
Make sure that you specify the backup database ID after the -b option.
<CMD_EXEC>
$VVVHOME/bin/vvvconfig.sh -s -b -d "${VVV_BKUP_DBID}"
</CMD_EXEC>
<UNDO>
$VVVHOME/bin/vvvconfig.sh -r -b
</UNDO>
Also, you must wait at least five seconds for the configuration change to
take place.
</ANSWER>
```
---

Client computer 30 does not display the XML tag names in Listing 2, text within the greater than ">" and less than symbols "<", nor the text content between the <CMD_EXEC> tags and <UNDO> tags. In a specific embodiment, the presented document includes a user-activatable trigger mechanism, e.g., a "Do It For Me" button, able to automatically generate a shell script to execute the command found between the <CMD_EXEC> tags. The generated shell script is then received and executed by the client computer 30, e.g., via an applet. An "Undo" button, similar to the "Do It For Me" button, is created for the command specified between the <UNDO> tags.

Modifications and variations of the above-described embodiment according to the present invention are contemplated. For example, in one particular embodiment, a client computer 30 having a client program 32 operates as described above with respect to client computer 10 and client program 14; however, the information used to generate troubleshooting and repair commands is automatically generated as a remote support agent program 34 on the client computer. One particular implementation is as a shell script program automatically created, uploaded, and remotely executed on client computer 30 after a user initiates execution of troubleshooting command set 22, e.g., the user selects a "do it for me" hyperlink button 24, associated with a knowledge base document 20 returned and displayed in the user's web browser after the user searched for particular issue documents on a software vendor's support website. In an alternate embodiment, execution of a remote support agent program 34 transmitted to client computer 30 is initiated by a support engineer attempting to resolve an issue for a user. In a particular embodiment, an authentication mechanism and secure delivery mechanism ensure that client computer 30 is not negatively impacted.

Because creating a unique remote agent instruction set for every issue could heavily burden the software vendor's engineers, the remote agent command sets, e.g., troubleshooting command set 22, are created automatically. A trigger is added to the troubleshooting document authoring system used by the support engineers to create a knowledge base document 20. The document authoring system includes a "wizard" interface guiding support engineers to enter a set of troubleshooting and/or repair commands as part of the process of authoring new troubleshooting documents, i.e., knowledge base document 20. The command set is then present in the text of a troubleshooting document, i.e., as in knowledge base document 26, and also are automatically generated into a remote agent instruction set, i.e., as in troubleshooting command set 22, associated with a knowledge base document 20. Using an underlying pre-defined XML format for the documents and instruction sets facilitates the automated handling of the data. Another benefit of associating the remote assistance commands consistently with the documents is evident in support knowledge life-cycle control. At the time a document is updated or retired because the contained information is no longer pertinent (or has perhaps even become harmful), the remote agent instruction set is also automatically updated or retired accordingly. That is, if a knowledge base document 20 is later determined to be incorrect or inapplicable, deletion or removal of the document concurrently removes the associated troubleshooting command set 22 and prevents generation of a remote program 34 based on the removed troubleshooting command set 22.

In one specific embodiment, client program 14 informs a user prior to executing a troubleshooting command set 22, and informs the user of the results after performing the troubleshooting or repair. In many cases, the user is able to manually force the client program 14 to "undo" the executed troubleshooting or repair (especially in the case where the attempted troubleshooting or repair did not work or caused negative side effects); therefore, in other specific embodiments an "undo" instruction set is provided for every troubleshooting command set. In one embodiment, the undo instruction set is provided as part of the troubleshooting command set 22. In another embodiment, the undo instruction set is a separate entry (not shown) in knowledge base 18.

In still another embodiment, client program 14 proactively transmits information to the server program 16 on a recurring basis every time a change in the user environment on user computer 10 is detected. This enables server program 16 to transmit proactive troubleshooting or repair instructions to client program 14, if needed (as determined by the server program evaluation of the client program information received), before any problems arise in the user environment.

An additional embodiment according to the present invention incorporates a remedial assistant agent in combination with the above-described system.

As described above, the troubleshooting knowledge base 18 includes a knowledge base document 20 to help users self-solve problems with software executing on client computer 10. Typically, knowledge base document 20 describes the problem, the problem context, and provides information about performing steps to resolve the problem. The provided information relates to the installation of a patch, a change of the client computer 10 configuration, a series of commands to be executed on the client computer, etc.

An embodiment of the present invention enhances the troubleshooting information by associating with each knowledge base document 20 a downloadable agent (Remedial Assistant Agent) 34 to assist the user during the self-solve process. The assistance starts in an interactive mode, during which the downloaded agent 34 executing on computer 30 performs verification of client computer 30 and software executing on the client computer and the user validates each step of the troubleshooting process prior to execution by the agent 34. As a trust relationship is built between the agent 34 and the user, the user allows fully automated execution of agent assistance and the agent is executed by client computer 10 to solve problems on the user's behalf.

The goal is initially to enhance the user experience and then to transition towards a true self-healing system by coupling the Remedial Assistant Agents 34 with detection mechanisms.

Figure 2:
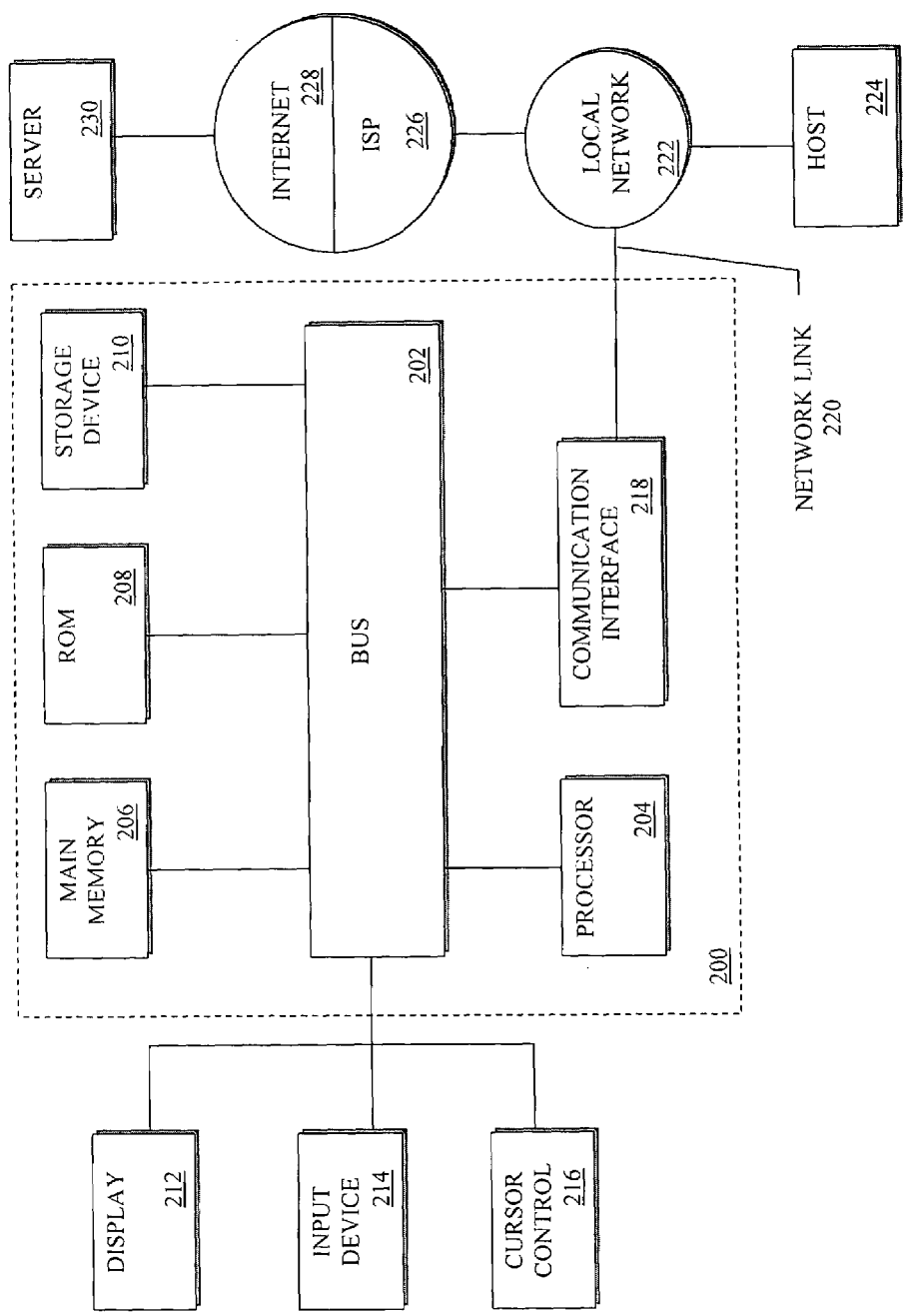
FIG. 2 is a block diagram of a computer system useable in conjunction with an embodiment of the present invention.

FIG. 2 is a block diagram illustrating an exemplary computer system 12 upon which an embodiment of the invention may be implemented. The present invention is usable with currently available personal computers, mini-mainframes and the like. Client computer 10 is functionally similar to server computer 12.

Computer system 12 includes a bus 202 or other communication mechanism for communicating information, and a processor 204 coupled with the bus 202 for processing information. Computer system 12 also includes a main memory 206, such as a random access memory (RAM) or other dynamic storage device, coupled to the bus 202 for storing transaction and interaction data, and instructions to be executed by processor 204. Main memory 206 also may be used for storing temporary variables or other intermediate information during execution of instructions to be executed by processor 204. Computer system 12 further includes a read only memory (ROM) 208 or other static storage device coupled to the bus 202 for storing static information and instructions for the processor 204. A storage device 210, such as a magnetic disk or optical disk, is provided and coupled to the bus 202 for storing transaction and interaction data, and instructions.

Computer system 12 may be coupled via the bus 202 to a display 212, such as a cathode ray tube (CRT) or a flat panel display, for displaying information. An input device 214, including alphanumeric and function keys, is coupled to the bus 202 for communicating information and command selections to the processor 204. Another type of user input device is cursor control 216, such as a mouse, a trackball, or cursor direction keys for communicating direction information and command selections to processor 204 and for controlling cursor movement on the display 212. This input device typically has two degrees of freedom in two axes, a first axis (e.g., x) and a second axis (e.g., y) allowing the device to specify positions in a plane.

The invention is related to the use of computer system 12, such as the illustrated system of FIG. 2, to provide a system for troubleshooting a computer system. According to one embodiment of the invention, the knowledge base document 20 and troubleshooting command set 22 are provided to a connected computer system 10 by computer system 12 in response to processor 204 executing sequences of instructions contained in main memory 206 in response to input received via input device 214, cursor control 216, or communication interface 218. Such instructions may be read into main memory 206 from another computer-readable medium, such as storage device 210.

However, the computer-readable medium is not limited to devices such as storage device 210. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 206 causes the processor 204 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 12 also includes a communication interface 218 coupled to the bus 202. Communication interface 208 provides two-way data communication as is known. For example, communication interface 218 may be an integrated services digital network (ISDN) card, a digital subscriber line (DSL) card, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals which carry digital data streams representing various types of information. Of particular note, the communications through interface 218 may permit transmission or receipt of issue descriptions from client computer 10 and knowledge base document 20 and associated troubleshooting command set 22 from server computer 12. For example, two or more computer systems 12 may be networked together in a conventional manner with each using the communication interface 218.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals which carry digital data streams. The signals through the various networks and the signals on network link 220 and through communication interface 218, which carry the digital data to and from computer system 12, are exemplary forms of carrier waves transporting the information.

Computer system 12 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for troubleshooting a computer system.

The received code may be executed by processor 204 as it is received, and/or stored in storage device 210, or other non-volatile storage for later execution. In this manner, computer system 12 may obtain application code in the form of a carrier wave.

It will be understood by persons of skill in the art that although troubleshooting information and instructions are herein described, the information and instructions may also include repair information and repair instructions for repair of client computer 10.

After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A system for troubleshooting a first computer system, comprising:
a second computer system comprising:
a memory storing:
an electronic document comprising a knowledge base document comprising troubleshooting information;
a set of troubleshooting commands for execution by the first computer system and related to the troubleshooting information of the electronic document, wherein the troubleshooting command set is associated with the electronic document;
a processor for receiving a troubleshooting request from the first computer system and, in response to the troubleshooting request, transmitting the electronic document and access to the troubleshooting command set to the first computer system.

2. The system of claim 1, wherein the troubleshooting command set is embedded in the electronic document.

3. The system of claim 2, wherein the electronic document is formatted using XML format.

4. The system of claim 1, wherein the troubleshooting command set is transferred from the second computer system to the first computer system upon access of the electronic document by the first computer system.

5. The system of claim 4, wherein the troubleshooting command set is automatically transferred from the second computer system to the first computer system and further comprising:
the first computer system automatically executing the transferred troubleshooting command set.

6. The system of claim 4, wherein user confirmation is required for each step of execution of the transferred troubleshooting command set on the first computer system.

7. The system of claim 1, wherein the processor provides an electronic document matching at least a portion of the content of the troubleshooting request.

8. The system of claim 1, wherein the troubleshooting command set includes a remedial assistant agent.

9. The system of claim 1, wherein the troubleshooting information is arranged to enable a user to self-solve a problem related to the troubleshooting request.

10. A method of troubleshooting a first computer system, comprising the step of:
receiving a troubleshooting request at a second computer system from a first computer system;
in response to the troubleshooting request, transmitting an electronic document from the second computer system to the first computer system, wherein the electronic document comprises:
access to a troubleshooting command set associated with the electronic document; and
a knowledge base document comprising troubleshooting information.

11. The method of claim 10, wherein the troubleshooting command set is embedded in the electronic document.

12. The method of claim 11, wherein the electronic document is formatted using XML format.

13. The method of claim 10, wherein the troubleshooting command set is transferred from the second computer system to the first computer system at substantially the same time as transmission of the electronic document.

14. The method of claim 13, wherein the troubleshooting command set is automatically transferred from the second computer system to the first computer system and further comprising:

the first computer system automatically executing the transferred troubleshooting command set.

15. The method of claim 13, wherein user confirmation is required for each step of execution of the transferred troubleshooting command set on the first computer system.

16. The method of claim 10, further comprising the step of:
matching at least a portion of the content of the troubleshooting request with an electronic document at the second computer system; and
wherein electronic document transmitted in the transmitting step is a matched electronic document.

17. The method of claim 10, wherein the troubleshooting command set includes a remedial assistant agent.

18. The method of claim 10, wherein the transmitting comprises transmitting troubleshooting information arranged to enable a user to self-solve a problem related to the troubleshooting request.

19. A method of generating an electronic document including troubleshooting information and a set of troubleshooting commands for execution by a first computer system, comprising:
input of troubleshooting information describing a particular problem, wherein the input of troubleshooting information comprises storing the troubleshooting information in a knowledge base document;
input of a troubleshooting command, wherein the command is adapted for execution by the first computer system to resolve the particular described problem; and
generating an electronic document based on the combined troubleshooting information input and troubleshooting command input, wherein the troubleshooting command is executable by the first computer system.

20. The method of claim 19, wherein execution of the troubleshooting command by the first computer system causes generation of a remedial assistant agent on the first computer system.

21. The method of claim 19, wherein the generated electronic document includes a reference to the troubleshooting command.

22. The method of claim 19, wherein the generated electronic document includes the troubleshooting command integrated in the electronic document.

23. The method of claim 19, wherein the troubleshooting information is arranged to enable a user to self-solve a problem related to the troubleshooting request.

* * * * *